(12) United States Patent
Camblor

(10) Patent No.: US 6,230,905 B1
(45) Date of Patent: May 15, 2001

(54) CLAMPING DEVICE FOR BOTTLES AND USE THEREOF

(76) Inventor: José Antonio Blanco Camblor, rue du Homvent 50, B-4020, Jupille (BE)

( * ) Notice: Subject to any disclaimer, the term of this patent is extended or adjusted under 35 U.S.C. 154(b) by 0 days.

(21) Appl. No.: 09/142,536
(22) PCT Filed: Mar. 5, 1999
(86) PCT No.: PCT/BE97/00030
§ 371 Date: Nov. 4, 1998
§ 102(e) Date: Nov. 4, 1998
(87) PCT Pub. No.: WO97/32506
PCT Pub. Date: Sep. 12, 1997

(30) Foreign Application Priority Data

Mar. 7, 1996 (BE) .................................................. 9600202

(51) Int. Cl.⁷ .................................................. A47B 73/00
(52) U.S. Cl. ........................... 211/74; 248/312; 403/256; 403/321
(58) Field of Search ............................ 211/74, 76, 71.01; 278/312, 313, 315; 403/329, 321, 322.4, 326, 256

(56) References Cited

U.S. PATENT DOCUMENTS

| | | | |
|---|---|---|---|
| 769,846 | * 9/1904 | Stocker | 248/312 X |
| 1,534,912 | * 4/1925 | Bruderlein | 248/312 X |
| 1,902,354 | * 3/1933 | Corke et al. | 248/312 |
| 2,338,310 | * 1/1944 | Barnes | 211/74 |
| 4,887,726 | * 12/1989 | Cizaire | 211/74 |
| 4,998,647 | * 3/1991 | Sharp | 211/113 X |
| 5,839,711 | * 11/1998 | Bieck et al. | 248/313 |
| 5,848,534 | * 12/1998 | Stauffer | 312/311 X |

FOREIGN PATENT DOCUMENTS

| | | |
|---|---|---|
| 597 796 | 4/1978 | (CH) . |
| 2 327 743 | 5/1997 | (FR) . |
| 2 229 352 | 9/1990 | (GB) . |

* cited by examiner

Primary Examiner—Daniel P. Stodola
Assistant Examiner—Erica B. Harris
(74) Attorney, Agent, or Firm—Sughrue, Mion, Zinn, Macpeak & Seas, PLLC

(57) ABSTRACT

A device for clamping, substantially horizontally, a bottle having a bottom and a neck provided with a collar. The device comprises a body provided with an opening in which part of the neck is inserted, and an element pivotally attached to a face of the body directed toward the opening. The element pivots around an axis which is perpendicular to the axis of passage of the opening. Furthermore, the element has a first portion supporting a part of the neck directed towards the bottom of the bottle and a second portion supporting a part of the neck adjacent to the collar.

22 Claims, 3 Drawing Sheets

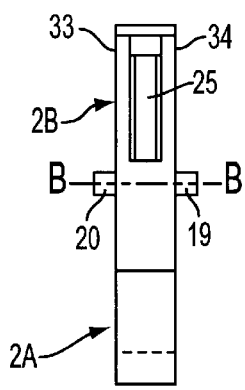
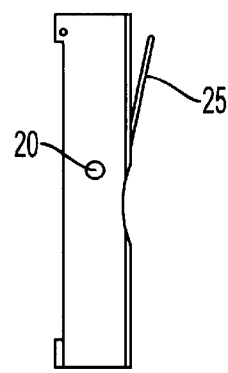
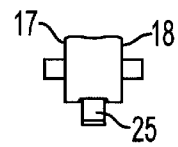
FIG. 3    FIG. 3A    FIG. 3B
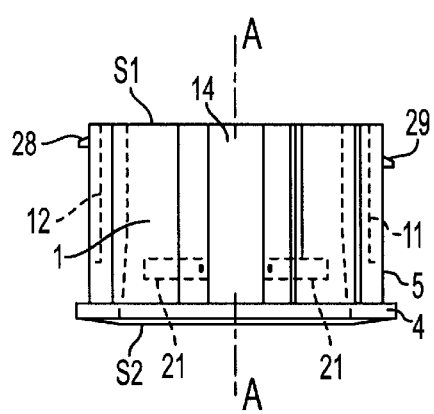
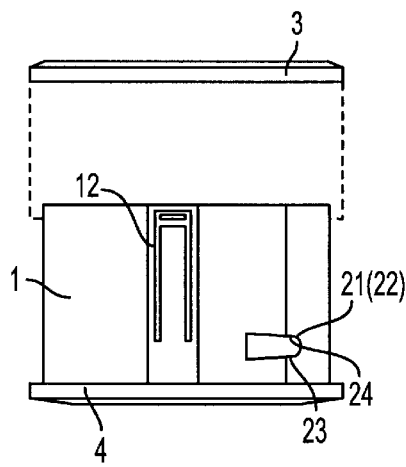
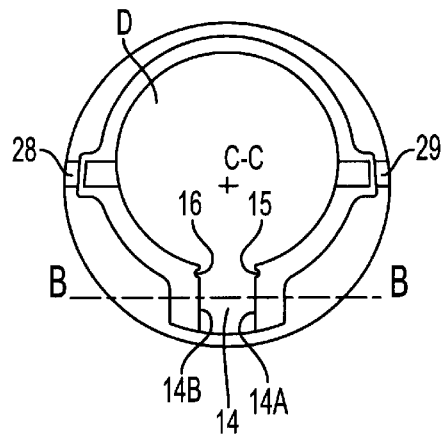
FIG. 4    FIG. 5
FIG. 6

CLAMPING DEVICE FOR BOTTLES AND USE THEREOF

THE PRIOR ART

Supports for wine bottles are well known. These supports have an opening wherein a bottleneck is housed, and an arm for supporting a part of the bottle next to the bottom thereof.

A support provided with a clamping device for a bottle with a bottom and a neck comprising a collar is known from FR-A-2 327 743. The clamping device includes a body with an opening for inserting part of the neck of the bottle in such a way that said neck has, with respect to said opening, a downward facing surface and an upward facing surface, and a moving part attached to the support for engaging at least partially the neck of the bottles, wherein the said opening has a downward facing surface.

These supports have the drawback that they have a large size, that they need difficult handling operations for taking out a bottle, and they do not ensure the best safety for bottles, etc.

BRIEF DESCRIPTION OF THE INVENTION

The invention relates to a device for holding a bottle, especially a wine bottle, to a plate provided with such devices and to a cupboard or cabinet provided with such a plate. In the present description, the term bottles refers to any container or flask having a neck.

The device of the invention is a device for clamping substantially horizontally a bottle which has an axis of symmetry, a bottom, and a neck with a free end, said neck being provided with a collar near its free end, the said neck having a first part adjacent to said collar and a second part directed towards the bottom with respect to the said first part, the axis of symmetry of the clamped bottle being intended to be substantially horizontal. The device of the invention comprises:
  a body provided with an opening with an axis of passage, said opening being defined by at least a first face and a second face opposite to the said first face, the neck of a bottle being intended to be partially engaged into opening, so that the said neck has a face directed towards the first face of the opening and a face directed towards the second face of the opening, and
  a element pivotally attached to the first face of the opening, said element pivoting around a pivoting axis perpendicular to the axis of passage of opening, said element having two supporting parts for supporting parts of the face of the neck directed towards the first face of the opening, a first supporting part being intended to support at least partly the face of the second part of the neck, while the second supporting part is intended to support at least partly the face of the first part of the neck adjacent to the collar.

According to a characteristic, the device comprises a body having at least one opening, said body being adapted so that the bottle whose neck is engaged in the opening has a substantially horizontal axis, preferably forming an angle of 1° to 15° with a horizontal plane, said angle being such that the crossing point between said axis and the bottom of the bottle is at a level below the level of the axis which extends in the neck. Preferably, the angle formed by said axis and a horizontal plane is between 4° and 10° (particularly 5° to 6°).

According to an embodiment, the pivoting element is designed to rest on a downward face of the neck. Preferably, the opening is defined between one or more walls of the body, said opening being designed in such a way that at least the upward face of the neck rests on a wall defining the opening.

Particularly, the opening is designed in such a way that a part of the neck, next to the collar thereof, but turned towards the bottom of the bottle, rests on a wall defining the opening.

According to a particular embodiment, the opening is substantially cylindrical, but this opening preferably has a truncated cone shape and has an axis, said opening extending between two ends, the passage surface of the opening perpendicular to the axis thereof, at the end next to the neck collar inserted in the opening being lower than the passage surface of the opening perpendicular to the axis thereof at the other end. According to this preferred embodiment, the axis of the opening is inclined with respect to a horizontal plane.

According to another embodiment, the pivoting element has two parts, the first being designed to act as a support for a part of the neck turned towards the bottom of the bottle, whereas the second part is designed to rest on a part of the downward face of the neck, adjacent to the collar. In this embodiment, the second part preferably has an end designed to rest on a part of the collar. Particularly, the element is an element pivoting with respect to a substantially horizontal axis, the distance between the first part and the axis being greater than the distance between the second part and said axis.

According to a detail of an advantageous embodiment, a means acts on the pivoting element to exert a force thereon aiming at pushing it against a part of the downward face of the neck, said part being preferably adjacent to the collar. Such a means may be for example a spring blade, particularly borne by the pivoting element.

According to a further detail of an embodiment, the device includes a means for keeping the pivoting element in a position wherein said piece exerts no more force on the neck, preferably wherein said means opposes the force exerted by the spring blade.

For example, the device is in the form of a hollow cylindrical body, intended to be housed inside a hole formed in a support. Advantageously, said body has a rim which is meant to rest on a face of the support, as well as means for cooperating with a ring which is meant to rest on the face of the support opposite to the face whereon the rim rests. According to a characteristic of this example, the body has one or more flexible tongues provided with a retaining tooth which is intended to rest on a wall of the hole, upon engagement of the body in said hole, to cause said tongue(s) to bend towards the hollow of the body.

According to another embodiment, the device includes a movable valve, whereon a return means acts to close the opening when a bottleneck is taken out.

The device according to the invention may also include a locking mechanism allowing to lock the pivoting element.

The invention also relates to a support provided with one or more devices according to the invention.

Particularly, the support comprises several devices, said devices being arranged with respect to each other so that the bottles locked thereby are kept at a distance from each other. Preferably, the devices are arranged with respect to each other so that the bottles locked thereby can be taken out one by one without touching any other bottle.

For example, the support includes a plate which is vertical or intended to be mounted vertically in a structure or on a wall, the plate face turned towards the structure or the wall being advantageously provided with collectors for collecting any fluid flowing from bottles and for preventing any fluid flowing from one bottle from flowing on the neck of another bottle.

The invention also relates to a cupboard including a support according to the invention.

According to an embodiment of the cupboard, a chamber intended for receiving the collars of the bottles locked by the devices or the free ends of the bottlenecks, locked by the devices, is defined therein.

In this embodiment, the devices preferably have each one movable valve, whereon a return means acts for closing the opening upon taking out a bottleneck, whereas the cupboard includes a means for controlling the atmosphere, particularly the humidity of the chamber. According to a detail of a cupboard, the latter includes a mechanism for locking the devices, preventing bottles from being taken out.

According to another detail of the cupboard, each locking device is associated to an electric system which is intended to transmit a signal to a controller.

The invention further relates to a method for aging the wine contained in the bottles, wherein the bottles are locked at their neck on a support according to the invention in order to ensure that the bottles do not touch each other, and to ensure that the axis of the bottles forms an angle of 1° to 15°, preferably of 4° to 10° with a horizontal plane, said angle being such that the crossing point between said axis and the bottom of the bottle is lower than the axis which extends in the neck.

Preferably, according to this method, the bottom of the bottles and the free end of the bottlenecks are distant from the walls of the room where the wine is aged.

In a particularly advantageous manner, the free ends of the bottlenecks are placed in a substantially watertight chamber inside the room, and the humidity of said chamber is controlled.

Characteristics and details of the invention will appear from the following detailed description, in which reference is made to the attached drawings, relating to an embodiment only illustrated by way of example.

BRIEF DESCRIPTION OF THE DRAWINGS

In these drawings,

FIG. 3 is a downside view of the pivoting element,

FIG. 3A is a side view of the pivoting element of FIG. 3,

FIG. 3B is a top view of the pivoting element of FIG. 3,

FIGS. 4 to 6 are side and front views of the body of the device, and

DESCRIPTION OF A PREFERRED EMBODIMENT ACCORDING TO THE INVENTION

Figure 1:
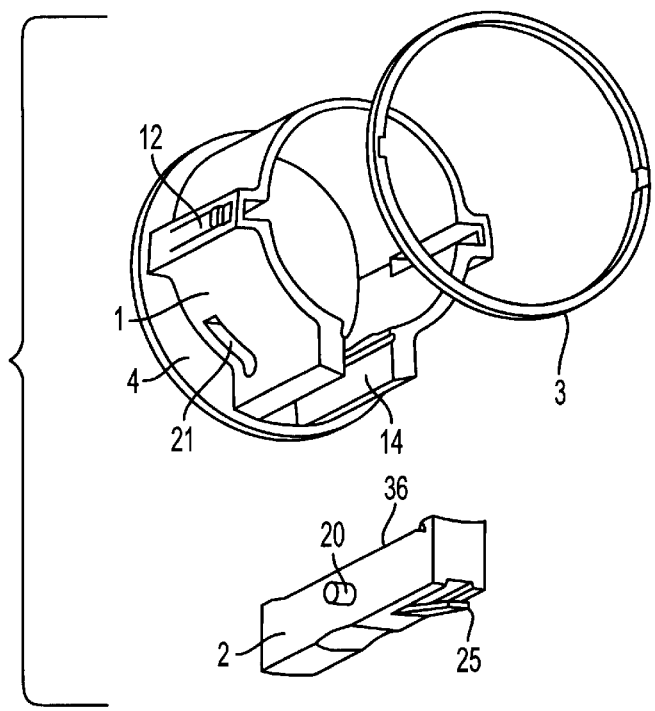
FIG. 1 is a perspective exploded view of a device according to the invention.
Figure 2:
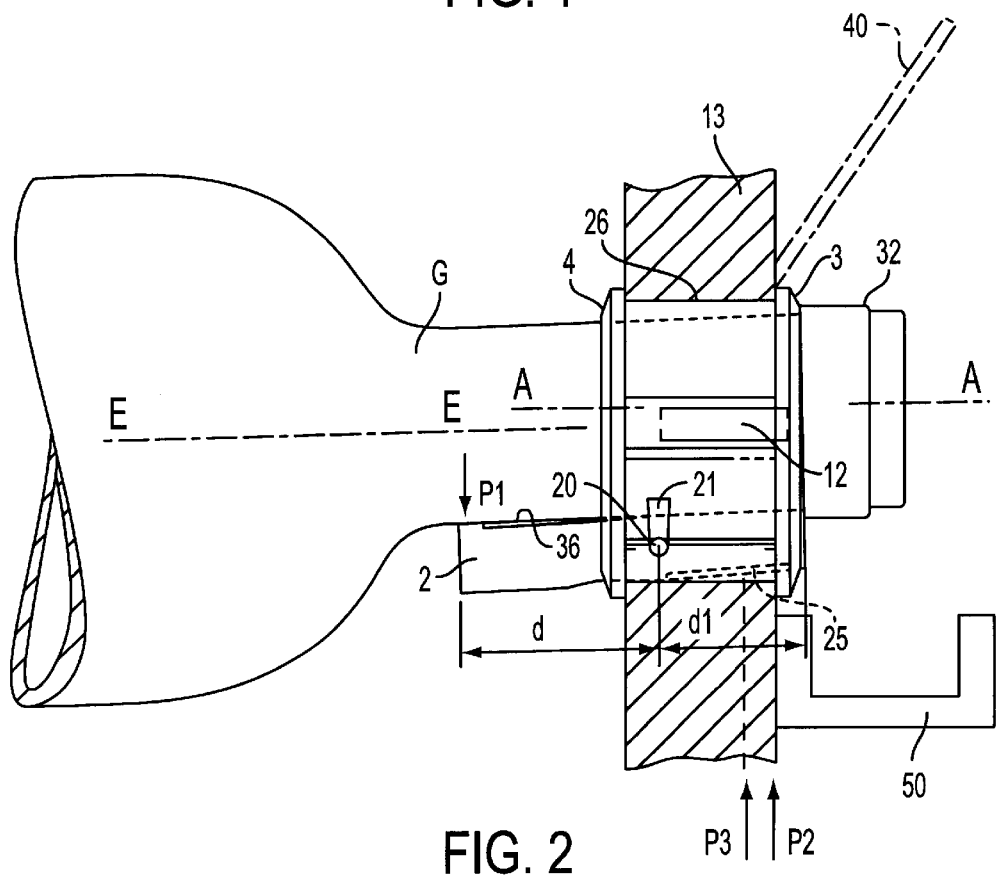
FIG. 2 shows the assembled device, mounted on a plate.
Figure 7:
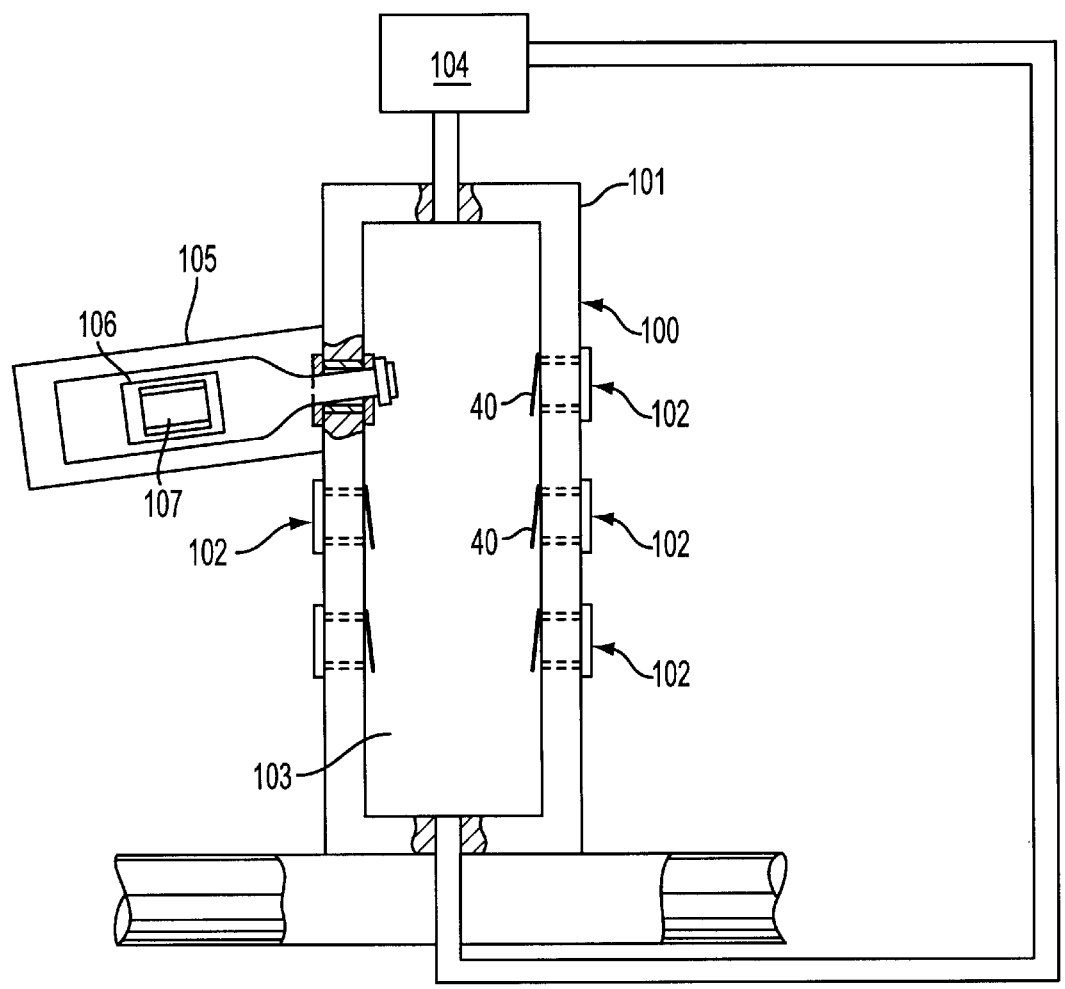
FIG. 7 is a schematic view of a cupboard according to the invention.

Referring now to the drawings in greater detail, the device includes a hollow body 1 which has a groove 14, wherein a lever 2 is intended to be housed. A ring 4 is used as a means for fastening the body 1 in a hole formed in the thickness of a support plate 13. The side walls 14A and 14B of the groove have clip-fastening throats 21, 22, each intended to receive a part of a rod or pin attached to the lever 2. Each throat forms a channel which narrows to form a minimum passage between two ends 23, 24, which opens into a cavity whose shape substantially corresponds to the shape of a part of a rod. The clip fastening throats 21, 22 shown in FIGS. 1 and 5 have also been represented partly in dashed lines in FIG. 4 which is a side view from the bottom of the body 1.

The parts of the rods 19, 20, which are simply fastened into the cavities of the throats by pressing them therein define an axis of rotation B—B for the lever 2, said axis B—B being substantially perpendicular to the axis A—A of the hollow defined in the body 1.

A flexible blade 25 is borne by the lever 2. This blade 2 ensures that the lever 25 can pivot and opposes movements of the lever, for example caused by undesired shocks.

The body 1 has a substantially cylindrical outer shape (axis C—C). This axis C—C is distant from the axis A—A of the body hollow. Such distance is advantageous for an optimal use (lower material consumption) of the material.

The lever is provided with thickener parts or protuberances 17, 18, which are intended to cooperate with the housings 15, 16 formed in the walls 14A and 14B of the groove. These protuberances are used as means for holding the lever in a position wherein the lever exerts no more force on the neck, preferably wherein said means opposes the force exerted by the spring blade 25.

In order to ensure that the body 1 is properly fixed on the plate 13, a ring 3 is clipped on the back end of the body 1. This ring is intended to cooperate with one or more teeth 28, 29 borne by two flexible blades of different lengths. These blades 11, 12 are mounted on the outer walls of the body 1. Upon engagement of the body 1 in the hole of the plate 13, the teeth touch the walls of the hole, causing the blades 11, 12 to pivot towards the hollow of the body. When the teeth no longer rest on the walls of the hole, the blades return to their normal state. So, the teeth borne by the blades are used as fastening means for the ring 3. The blades 11, 12 have different lengths, so as to allow the ring 3 to be fastened for different thicknesses of the plate.

The body 1 comprises, on its outward face, a rim or stop flange 4, said rim being intended to rest on the outward face of the plate 13.

The body 1 has a hollow D, allowing a part of the bottleneck G to pass therethrough. The lever 2 is intended to rest at least partially on the bottleneck.

The plate 13 is substantially vertical. The hollow D of the body is designed so that the bottle whose neck G is engaged in the hollow D has a substantially horizontal axis E—E. This axis E—E forms an angle of 4° to 6° with a horizontal plane, said angle being such that the crossing point between said axis and the bottom of the bottle is at a level below the level of the axis which extends in the neck G.

The lever 2 has a part 36 which rests on a downward face of the neck, whereas the wall defining the hollow of the body 1 is intended in such a way that at least the upward face of the neck rests on said wall.

In fact, the wall of the hollow and the lever 2 are adapted in such a way that, in the locked position, the collar rim 32 turned towards the bottom of the bottle rests on the end edge of the body (or on the ring 3) and on the end of the lever 2.

The hollow defined in the body 1 has a truncated cone shape and an axis, said hollow extending between two ends, the passage surface S1 of the hollow perpendicular to its axis A—A at its end adjacent to the neck collar 32 inserted in the hollow, being smaller than the passage surface S2 of the hollow perpendicular to its axis at its other end.

The axis A—A is slightly inclined with respect to a horizontal plane. Such an inclination is for example, of 1°.

The hinged lever 2 has two parts 2A, 2B, the first part 2A being adapted to act as a support for a part of the neck turned towards the bottom of the bottle, whereas the second part 2B is adapted to rest on a part of the downward face of the neck, adjacent to the collar 32.

Preferably, the lever 2 is hinged with respect to a substantially horizontal axis, while the first part 2A is at a distance d from the axis B—B which is greater than the distance separating the second part 2B from said axis B—B.

A dashed line outlines a movable valve 40, whereon a return means acts to close an end of the hollow when a bottleneck is taken out. This valve, for example, is hinged on the ring 3.

Advantageously, the support comprises several bodies 1, said bodies being arranged with respect to each other so that the bottles locked thereby are kept at a distance from each other, and so that the bottles locked thereby can be taken out one by one without touching any other bottle.

The back face of the plate 13 is advantageously provided with collectors 50 for collecting any fluid flowing from bottles and for preventing any fluid flowing from one bottle from flowing on the neck of another bottle.

While placing a bottle, a substantially horizontal position of the bottle, or a slight downward inclination of the neck is ensured. The neck G is inserted in the hollow of the body. Once the collar 32 of the bottle has passed the hollow of the body, the bottom of the bottle is pivoted downwards. During this movement, a part of the neck rests on the lever 2. The weight of the bottle P1 provides a pushing force P2 of the lever 2 at the collar 32. A supplementary pushing force P3 at the collar 32 is ensured by the spring blade 25.

In order to take out a bottle, the bottom of the bottle is slightly lifted to act on the lever against the spring blade 25 and to bring the protuberances 33, 34 into the cavities 15, 16. In this position, the lever 2 is locked in the groove 14 and the bottleneck may be taken out of the hollow, because the lever 2 is no longer situated in the hollow volume.

The invention is also related to a cupboard including a support according to the invention. This cupboard 100 comprises two substantially vertical walls 101, which have holes for the passage of devices 102 according to the invention, provided with valves 40. This cupboard defines a chamber 103, which is intended to receive the collars of the bottles locked by the devices or the free ends of the bottlenecks locked by the devices. When a device is not used to hold a bottle, the valve 40 closes the passage of the device. Hence, the chamber 103 may be isolated from the external atmosphere.

Preferably this chamber is associated to a means for controlling the atmosphere, particularly the humidity, of the chamber. This means 104 allows, for example, an ascending circulation of air having a controlled humidity or of an inert gas, for example nitrogen, having a controlled humidity. Advantageously, the means 104 also allows a temperature control of the chamber 103.

The cupboard 100 may include a locking mechanism, which may be key-operated, electronic, etc. for the devices, to prevent bottles from being taken out or stolen.

The cupboard may be also provided with locking mechanisms associated to an electric system intended to transmit a signal to a controller.

If the cupboard is not placed in a cellar, it may be useful to use covers for the part of the bottles extending outside the chamber 103. Said cover may have an aperture 106 to allow the label 107 to be read. Said cover is made of a mat material, so as to ensure that the bottle content is always in the dark. Since the bottles are substantially horizontal, advantages may be obtained from placing the labels with horizontal or substantially horizontal indications, so that they may be read without turning the bottle or taking it out.

The invention also relates to a method for aging the wine contained in the bottles, wherein the bottles are locked at their neck on a support, for example a support of a cupboard 100, in order to ensure that the bottles do not touch each other, and to ensure that the axis of the bottles forms an angle F of 1° to 15°, preferably of 4° to 10° with a horizontal plane, said angle being such that the crossing point between said axis and the bottom of the bottle is at a level lower than the level of the axis which extends in the neck.

Preferably, the bottom of the bottles and the free end of the bottlenecks are distant from the walls of the room where the wine is aged.

Particularly, the free ends of the bottlenecks are placed in a substantially watertight chamber 103 inside the room, the humidity and/or the temperature in said chamber being under control.

What is claimed is:

1. A device for clamping, substantially horizontally, a bottle which has an axis of symmetry, a bottom, and a neck with a free end, said neck being provided with a collar near its free end, said neck having a first part adjacent to said collar and a second part directed towards the bottom with respect to said first part, the axis of symmetry of the clamped bottle being intended to be substantially horizontal, said device comprising:

a body provided with an opening with an axis of passage, said body having first and second inner portions which are opposite to and separate from one another for partially engaging the neck of a bottle in said opening, and for the passage of the collar through said opening in a direction corresponding to the axis of passage of the opening, said first and second inner portions being separate from one another for directing a face of the first part of the neck towards the second inner portion of the body and for directing a face of the second part of the neck towards the first inner portion of the body, and an element pivotally attached to the first inner portion of the body, said element being pivotable around a pivoting axis perpendicular to the axis of passage of the opening, said element having first and second supporting portions for supporting parts of a face of the neck directed towards the first inner portion of the body, a first supporting portion of the element being adapted for supporting at least partly the face of the second part of the neck directed towards the first inner portion of the body, while the second supporting portion of the element is adapted for supporting at least partly a face of the first part of the neck directed towards the first inner portion of the body, whereby the pivoting axis of the element extends between the first supporting portion and the second supporting portion so that when the first supporting portion of the element supports at least partly the face of the second part of the neck directed towards the inner portion of the body, the second supporting portion contacts the face of the first part of the neck and pushes said first part of the neck against the second inner portion of the body.

2. The device of claim 1 in which the second supporting portion of the element has an end adapted for resting on a part of the collar of the neck of a bottle clamped by said device.

3. The device of claim 1, in which the first supporting portion and the second supporting portion extend respectively at a first distance from the pivoting axis of the element, and at a second distance from the pivoting axis of the element, said first distance being greater than said second distance.

4. The device of claim 1, which comprises a means acting on the pivoting element to exert a force thereon aiming at pushing the second supporting portion of the element towards the second inner portion of the opening of the body.

5. The device of claim 4, in which the means acting on the pivoting element to exert a force thereon aiming at pushing the second supporting portion of the element towards the second inner portion of the opening of the body in a spring blade borne by said pivoting element.

6. The device of claim 1, which comprises a means for keeping the pivoting element in a position so as to exert no additional force on the neck of a bottle engaging the opening of the body.

7. The device of claim 1, which comprises:
   (a) a means acting on the pivoting element to exert a force thereon aiming at pushing the second supporting portion from a first position adjacent to the first inner portion of the opening of the body to a second position directed towards the second inner portion of the opening of the body, and
   (b) a means for keeping the pivoting element in said first position.

8. The device of claim 1, the body of which has an opening adapted so that a bottle whose neck is engaged in said opening has a symmetrical axis forming an angle of 1° to 15° with a horizontal plane, said angle being such that the crossing point between said symmetrical axis and the bottom of the bottle is at a level lower than the level of the part of the symmetrical axis which extends in the neck of the bottle.

9. The device of claim 1, the body of which has an opening adapted so that a bottle whose neck is engaged in said opening has a symmetrical axis forming an angle of 4° to 10° with a horizontal plane, said angle being such that the crossing point between said symmetrical axis and the bottom of the bottle is at a level lower than the level of the part of the symmetrical axis which extends in the neck of the bottle.

10. The device of claim 1, the body of which has a substantially cylindrical opening.

11. The device of claim 1, the body of which has an opening with a truncated cone shape with a central axis, said opening extending between a first end through which the neck of a bottle is engaged into the opening and a second end opposite to the first end, the opening having a first passage surface perpendicular to said central axis at said first end, and a second passage surface perpendicular to the central axis at the second end, the first passage surface being greater than the second surface passage.

12. The device of claim 11, in which the central axis of the opening is inclined with respect to a horizontal plane.

13. The device of claim 1, in which the body has the shape of a hollow cylindrical body, for housing inside a hole formed in a support.

14. The device of claim 13, in which the body is provided with a rim, for resting on a face of the support when the body is housed inside a hole of the said support.

15. The device of claim 1, wherein the body has the shape of a hollow cylindrical body, for housing inside a hole formed in a support, and extends between two opposite ends, said body being provided at a first of its opposite ends with a rim, for resting on a first face of the support when the body is housed inside a hole of said support, and at the second of its opposite ends, with means intended to cooperate with a ring for resting on a second face of the support.

16. The device of claim 15, wherein the body has at least one flexible tongue provided with a retaining tooth for resting on an inner wall of the hole, upon engaging the body in said hole, to cause said tongue to bend towards the hollow of the body.

17. The device of claim 1, which comprises a movable valve and a return means acting on the valve for closing the opening when a bottleneck is not mounted in said opening.

18. The device of claim 1, which comprises a locking mechanism for locking the pivoting element.

19. A bottle holder comprising a support having a hole formed therein and the device of claim 1 housed inside said hole, wherein the body has the shape of a hollow cylindrical body, said hole having an inner wall extending between a first face of the support and a second face opposite to said first face,
   wherein the body extends between two opposite ends, said body being provided at a first of its opposite ends with a rim resting on the first face of the support, and at the second of its opposite ends with means for cooperating with a ring resting on the second face of the support.

20. The bottle holder of claim 19, wherein the body has at least one flexible tongue provided with a retaining tooth which rests on the inner wall of the hole, upon engagement of the body in the hole, to cause the tongue to bend towards the hollow of the body.

21. A bottle support comprising a plate having several holes distant one from another and a bottleneck clamping device housed in said plate for clamping, substantially horizontally, a bottle which has an axis of symmetry, a bottom, and a neck with a free end, said neck being provided with a collar near its free end, said neck having a first part adjacent to said collar and a second part directed towards the bottom with respect to said first part, the axis of symmetry of the clamped bottle being intended to be substantially horizontal, said device comprising:
   a body provided with an opening with an axis of passage, said body having first and second inner portions which are opposite to and separate from one another for partially engaging the neck of a bottle in said opening and for the passage of the collar through said opening in a direction corresponding to the axis of passage of the opening, said first and second inner portions being separate from one another for directing a face of the first part of the neck towards the second inner portion of the body and for directing a face of the second part of the neck towards the first inner portion of the body, and
   an element pivotally attached to the first inner portion of the body, said element being pivotable around a pivoting axis perpendicular to the axis of passage of the opening, said element having first and second supporting portions for supporting parts of a face of the neck directed towards the first inner portion of the body, a first supporting portion of the element being adapted for supporting at least partly the face of the second part of the neck directed towards the first inner portion of the body, while the second supporting portion of the element is adapted for supporting at least partly a face of the first part of the neck directed towards the first inner portion of the body, whereby the pivoting axis of the element extends between the first supporting portion and the second supporting portion so that when the first supporting portion of the element supports at least partly the face of the second part of the neck directed towards the inner portion of the body, the second supporting portion contacts the face of the first part of the neck and pushes said first part of the neck against the second inner portion of the body.

22. A cupboard comprising a vertical plate having several holes distant one from another and a bottleneck clamping device housed in said plate for clamping, substantially horizontally, a bottle which has an axis of symmetry, a bottom, and a neck with a free end, said neck being provided with a collar near its free end, said neck having a first part adjacent to said collar and a second part directed towards the bottom with respect to said first part, the axis of symmetry of the clamped bottle being intended to be substantially horizontal, said device comprising:

a body provided with an opening with an axis of passage, said body having first and second inner portions which are opposite to and separate from one another for partially engaging the neck of a bottle in said opening and for the passage of the collar through said opening in a direction corresponding to the axis of passage of the opening, said first and second inner portions being separate from the one another for directing a face of the first part of the neck towards the second inner portion of the body and for directing a face of the second part of the neck towards the first inner portion of the body, and an element pivotally attached to the first inner portion of the body, said element being pivotable around a pivoting axis perpendicular to the axis of the passage of the opening, said element having first and second supporting portions for supporting parts of a face of the neck directed towards the first inner portion of the body, a first supporting portion of the element being adapted for supporting at least partly the face of the second part of the neck directed towards the first inner portion of the body, while the second supporting portion of the element is adapted for supporting at least partly a face of the first part of the neck directed towards the first inner portion of the body, whereby the pivoting axis of the element extends between the first supporting portion and the second supporting portion so that when the first supporting portion of the element supports at least partly the face of the second part of the neck directed towards the inner portion of the body, the second supporting portion contacts the face of the first part of the neck and pushes said first part of the neck against the second inner portion of the body.

* * * * *